(12) United States Patent
Seel

(10) Patent No.: US 6,433,908 B2
(45) Date of Patent: Aug. 13, 2002

(54) BEAM DEFLECTION DEVICE

(75) Inventor: Matthias Seel, München (DE)

(73) Assignee: T.I.L.L. Photonics GmbH, Martinsried (DE)

(*) Notice: Subject to any disclaimer, the term of this patent is extended or adjusted under 35 U.S.C. 154(b) by 28 days.

(21) Appl. No.: 09/729,951

(22) Filed: Dec. 6, 2000

(30) Foreign Application Priority Data

Dec. 16, 1999 (DE) .......................................... 199 60 807

(51) Int. Cl.[7] .............................................. G02B 26/08
(52) U.S. Cl. ...................... 359/201; 359/202; 359/212; 359/223; 359/226
(58) Field of Search .............................. 359/201, 202, 359/208, 212, 223, 226

(56) References Cited

U.S. PATENT DOCUMENTS 4,997,242 A    3/1991   Amos
5,574,601 A *  11/1996  Hall .......................... 359/859

* cited by examiner

Primary Examiner—James Phan
(74) Attorney, Agent, or Firm—Nixon Peabody LLP; David S. Safran

(57) ABSTRACT

A device for deflecting a beam, having a first beam deflection unit (14) and a mirror arrangement (20) which images the deflection point (P) onto a destination point (P'). The mirror arrangement (20) is made rotationally-symmetrical over at least a certain range of deflection angles, the deflection point (P) and the destination point (P') being located on or near the axis (24) of rotational symmetry (24) of the mirror arrangement. There can be a second deflection unit (16) at the destination point (P'). Furthermore, a process for deflecting a given beam by means of rotation of the mirror surface of a planar mirror (14, 16) from a middle position involves setting the location of the axis (12, 18) of rotation of the plane mirror with respect to the planar mirror outside the mirror surface, the location of the axis of rotation with respect to the given beam being selected by determining the point at which the minimum variation of intersection points of rearward beam extensions occurs.

28 Claims, 2 Drawing Sheets

BEAM DEFLECTION DEVICE

BACKGROUND OF THE INVENTION

1. Field of the Invention

This invention relates to a device for deflection of a beam, especially a light beam, with an adjustable first beam deflection unit which deflects the beam at a deflection point and with a mirror arrangement which images the deflection point onto a destination point, the device preferably being made for independent deflection of the beam in two spacial directions for use in a two-dimensional scanner. The invention is also directed to a process for deflection of a given beam by turning the mirror surface of a plane mirror from a middle position.

2. Description of Related Art

A device of the above-mentioned type is known, for example, from U.S. Pat. No. 4,997,242 in which an a focal, achromatic mirror arrangement, which consists of two concave mirrors arranged opposite one another, is used to image the first rotary mirror on which the beam is incident onto a second rotary mirror, the axes of rotation of the first and second mirrors being perpendicular to one another in order to be able to independently deflect the beam, which is a light beam, in two spacial directions which are perpendicular to one another. Here, the disadvantage is that the mirror arrangement with the two opposing concave mirrors causes considerable astigmatism depending on the angle of rotation of the first mirror so that, even when using an ideal scanning lens, when the first mirror turns, the foci do not lie on a straight line after the second mirror.

Furthermore, imaging a first rotary mirror onto a rotary second mirror by means of an a focal lens combination is known for purposes of independently deflecting a light beam in two spacial directions perpendicular to one another. The defect here is the possibility of chromatic errors and other imaging errors occurring, especially for large angles.

Furthermore, it is known to arrange two rotary mirrors with axes of rotation that are orthogonal to one another and spatially as close as possible to one another. Here, the disadvantages are that the spatially separate location of the two points of rotation, the limited range of the angles of rotation and the necessity of having to generally use mirrors of different sizes.

SUMMARY OF THE INVENTION

The object of this invention is to devise a beam deflection device in which imaging errors are essentially independent of the deflection angle of a first deflection unit, and furthermore, are as small as possible.

Additionally, it is an object of the invention to provide a process for deflection of a given beam by turning the mirror surface of a plane mirror from a middle position, the axis of rotation of the plane mirror lying outside the mirror surface and still an offset of the deflected beam as small as possible occurring depending on the deflection angle.

The first object is achieved in accordance with the invention by a device in which the mirror arrangement is made rotationally-symmetrical at least over a certain range of deflection angles, the deflection point and the destination point being located on or near the axis of rotational symmetry of the mirror arrangement.

In this approach, it is advantageous that, by the rotationally symmetrical arrangement of the mirror arrangement with respect to the deflection point and the destination point, the optical properties of the mirror arrangement, and thus, of the entire device, are essentially independent of the deflection angle of the beam at the deflection point, so that the beam position at the destination point is invariant with respect to the beam deflection angle determined by the first beam deflection unit and only the direction of the beam at the destination point corresponding to the deflection angle at the deflection point changes.

Preferably, this invariance property of the device according to the invention is used to deflect the beam independently in two spacial directions by a second adjustable deflection unit being located at the destination point.

The second object is achieved by a process in which, for deflection of a given beam by means of rotation of the mirror surface of a plane mirror from a middle position, the location of the axis of rotation of the plane mirror being stipulated with respect to the plane mirror and lying outside the mirror surface, the location of the axis of rotation with respect to the given beam is determined by the fact that, for different points of incidence of the beam on the mirror surface for certain angles of rotation of the mirror, the intersection points of the beams which have been reflected at these angles of rotation and which are extended backwards are determined, with the beam which has been reflected in the middle position and which is extended backwards such that, for each point of incidence, a set of intersection points is obtained, from these sets of intersection points, that set of intersection points is determined which shows the minimum variation of intersection points with the angle of rotation with respect to a suitable criterion, and the location of the axis of rotation of the mirror is chosen according to the point of incidence which belongs to this set of intersection points.

It is advantageous that the axis of rotation of the mirror can be placed, for example, through the center of gravity of the mirror, and thus, a location of the mirror can be found in which only a small offset of the reflected beam occurs when the deflection angle changes.

In the following, several embodiments of the invention are detailed by way of example using the attached drawings.

DETAILED DESCRIPTION OF THE INVENTION

Figure 1:
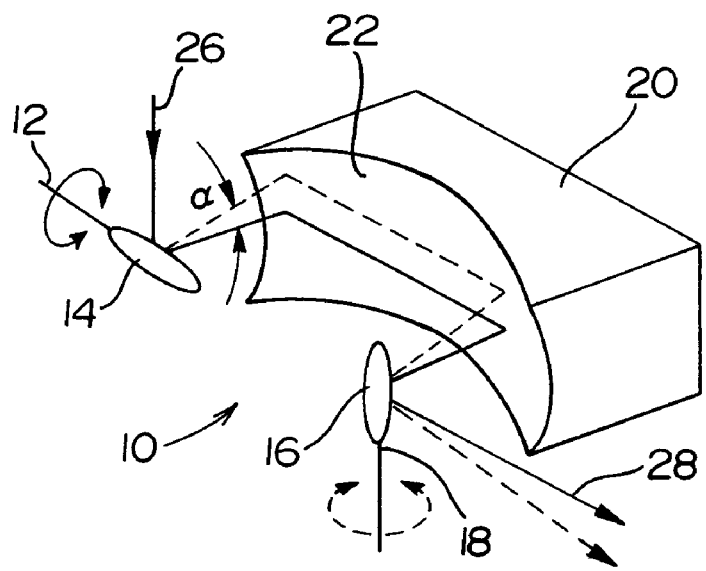
FIG. 1 shows a schematic perspective view of a first embodiment of the invention, FIG. 2 schematically shows an overhead view of the device from FIG. 1.
Figure 2:
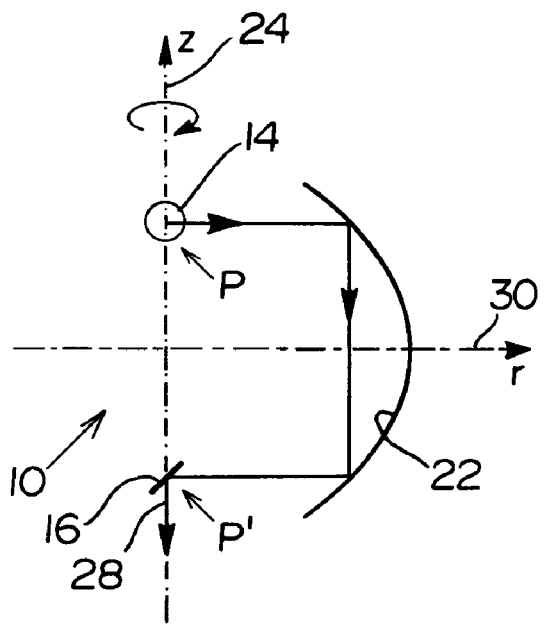

FIGS. 1 & 2 show a first embodiment of the invention, which has a module 10 which comprises a first mirror 14 which can be turned around a first axis of rotation 12 and a second mirror 16 which can be turned around a second axis of rotation 18 which is perpendicular to the first axis 12, and a mirror arrangement 20 which is made afocal and which images the first mirror 14 onto the second mirror 16. The first mirror 14 and the second mirror 16 are made as plane mirrors. As the drive for the adjustable mirror, for example, an ordinary galvanometer drive can be used. The mirror arrangement 20 has a mirror surface 22 which is made rotationally symmetrical over a certain range of angles of rotation with respect to the axis of rotational symmetry 24, the axis of rotation 12 of the first mirror 14 coinciding with the axis of rotational symmetry 24 or being offset slightly parallel thereto, while the axis of rotation 18 of the second mirror 16 is perpendicular to the axis 24.

An incident, generally collimated or almost collimated beam 26 which is perpendicular to the axis 12 or 24 strikes the first mirror 14 at a point P and is reflected by it in the direction which is perpendicular to the axis of rotational symmetry 24 onto the mirror surface 22 of the mirror arrangement 20, where it is reflected by 90° parallel to the axis 24. The beam is incident at another point again on the mirror surface 22, is in turn reflected there by 90° oppositely parallel to the direction leaving the first mirror 14, and finally, strikes the second mirror 16 where it is deflected at a point P' again by 90°.

The two mirrors 14 and 16 are arranged such that they, i.e., the respective point of incidence P or P' of the beam, lie on the axis 24 of rotational symmetry of the mirror surface 22 of the mirror arrangement 20. This rotational symmetry of the module 10 ensures that when the first mirror 14 is turned around its axis 12 of rotation by an angle α/2, the beam strikes the destination point, i.e., the point of incidence P' on the second mirror 16, independently of the angle of rotation of the first mirror 14, but from another direction, by which the emergent beam 28 is deflected in a spacial direction corresponding to the rotation of the first mirror 14, but does not suffer any offset (the beam path which is changed by the rotation of the mirror 14 is shown by the broken line in FIG. 1). By the rotation of the second mirror 16 around its axis of rotation 18, the emergent beam 28 can be deflected independently of the rotation of the first mirror 14 into a second spacial direction without parallel offset.

The underlying function of the module 10 lies in deflecting a beam 26 without beam offset in two spacial directions independently in a stipulated manner. This property can be used ideally for the two-dimensional scanning of a surface by the emergent beam 28 being pointed at a so-called scanning lens which converts the beam direction into a position in one plane. This application is especially suitable for use with a microscope, the image plane of the scanning lens lying in the intermediate image plane of the microscope. In particular, the microscope can be a confocal arrangement or a two-photon arrangement, and the incident electromagnetic beam can be a laser beam which causes fluorescent excitation of a sample which is located under the objective lens to be collected and detected by means of the same microscope or separately.

In the embodiments shown in FIGS. 1 & 2, the mirror surface 22 of the mirror arrangement 20 forms a part of the inside surface of a parabolic torus which is formed by the rotation of a parabola around the axis 24 of rotational symmetry of the mirror arrangement 20. The mirror surface 22 is mirror-symmetrical with respect to the plane of symmetry 30 which is perpendicular with respect to the axis of rotational symmetry 24, the mirrors 14 and 16, i.e., the points of incidence P and P', being mirror-symmetrical to one another with respect to the plane 30 of symmetry.

In the embodiment which is shown in FIGS. 1 & 2, the parabola can be described with the relation $r(z)=3f-z^2/4f$, the points of incidence P and P' being at $z=2f$ or $z=-2f$. Here, f is a freely selectable parameter, while z is the coordinate in the direction of the axis 24 of rotational symmetry and r is the coordinate in the radial direction perpendicular thereto in the plane 30 of symmetry.

As shown in FIGS. 1 & 2, the mirror surface 22 is made continuous. However, alternatively, the mirror surface can be formed by two separate segments, and the area around the apex of the parabola can remain recessed. In the former case, the mirror arrangement 20 can be made in one piece.

The beam 26 is preferably a light beam in the infrared, visible and/or ultraviolet range. Fundamentally the described arrangement is however also suited for other wavelength ranges (for example, radio waves or x-rays). If the corresponding mirror surfaces can be made available, the arrangement is also suited for particle beams.

One possible embodiment of the first mirror 14 and of the second mirror 16 has the axes of rotation 12, 18 of the mirrors 14, 16 running through the mirror surface and the point of incidence P or P' of the beam. In this case, the axis 12 of rotation of the first mirror 14 coincides with the axis 24 of rotational symmetry of the mirror surface 22. In this embodiment, it is disadvantageous that the center of gravity of the mirror 14 or the mirror 16 does not lie on the axis of rotation 12 or 18; due to the resulting unbalance, this leads either to heavy bearing load, or in the case of compensation of the unbalance by counterweights, increases in the moment of inertia of the mirror that slows down the adjustment.

Figure 3:
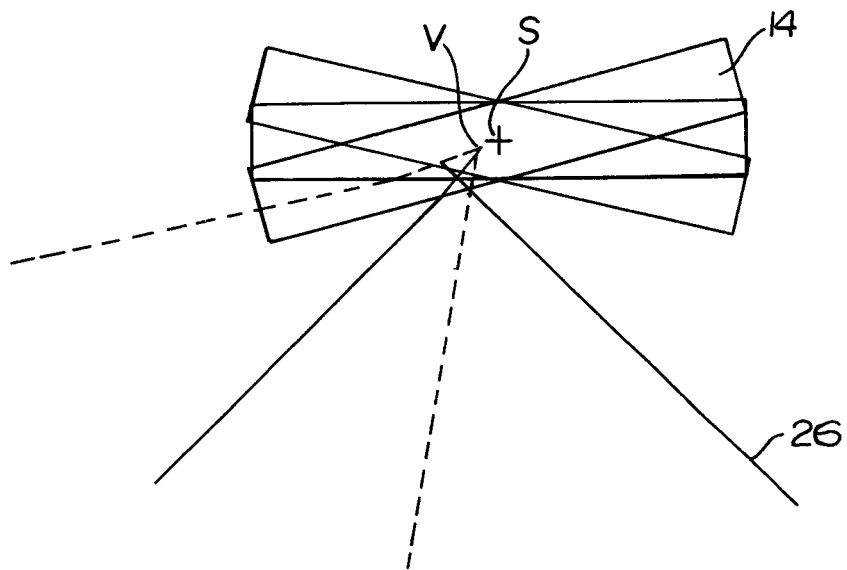
FIG. 3 shows an enlarged overhead view of a deflection mirror in different rotary positions as can be used in this invention.

In one alternative embodiment, the axis of rotation 12 or 18 of the mirror 14 or 16 does not run in its mirror surface, but is offset parallel with respect to it and runs through the center of gravity S of the mirror. But, to prevent parallel offset of the beam reflected on the mirror 14 or 16 as a function of the angle of rotation of the mirror, the axes of rotation 12 and 18, and thus the mirror 14 and 16, as a result of geometrical considerations, must be located at the correct point relative to the point of incidence of the beam so that a "virtual" center of rotation V, designated such here, arises which depends in a certain range of rotational angles relatively weakly on this angle, see FIG. 3. By corresponding positioning of the axis of rotation of the mirror, thus in spite of the axis of rotation which runs through the center of gravity of the mirror, the beam offset can be largely avoided. In this case, the axis 12 of rotation of the first mirror 14 with respect to the axis of rotational symmetry 24 of the mirror surface 22 is offset parallel.

The location of the best suited point of incidence of the beam on the mirror surface with the mirror located in the middle position and thus the most favorable location of the mirror or the location of the "virtual" center V of rotation can be determined by determining the intersection points of the backward extensions of the reflected beams at different angles of rotation of the mirror, with the backward extension of the beam reflected in the middle position of the range of rotational angles for different points of incidence in the middle position (the variation of the point of incidence corresponds to the mirror displacement in the middle position without rotation, i.e., the location of the axis of rotation determines the point of incidence) in a suitable manner, for example, with a computer or experimentally, and from these sets of intersection points, that set is determined which is associated with a certain incidence point (i.e., a certain position of the axis of rotation) and which with respect to a suitable criterion, satisfies the minimum variation of the points of intersection (for example, the minimum deviance or the like) so that finally a "virtual" center of rotation V which corresponds to this criterion arises. The use of this process for determining a "virtual" center of rotation is of course not limited to the case described here, but can be used in general for rotary mirrors in which the axis of rotation does not lie in the mirror surface.

Figure 4:
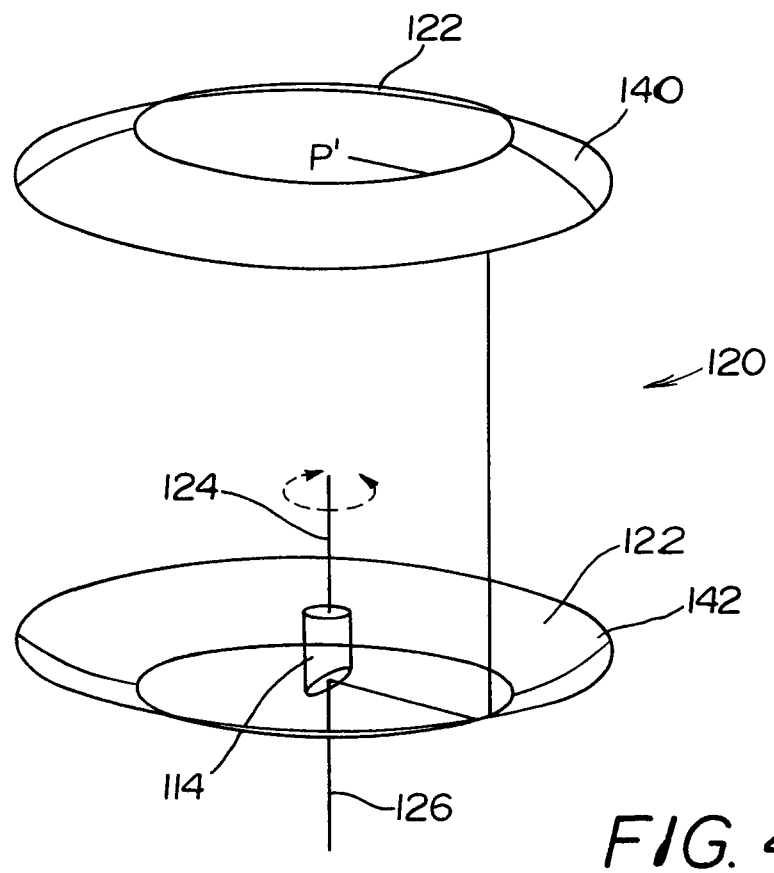
FIG. 4 shows a schematic perspective view of a second embodiment of the invention.

FIG. 4 shows one alternative embodiment of the invention which differs from the embodiment as shown in FIGS. 1 and 2 in four important aspects: The mirror surface 122 of the mirror arrangement 120 is formed by two separate segments 140 and 142 with rotational symmetry extending over a full 360° so that the incident beam 126, in principle, can be turned by a full 360°; at the destination point P' there is no second mirror; the incident beam 126 is not perpendicular to the axis of rotational symmetry of the mirror surface 122, but corresponds to it; the first mirror 114 is turned around the axis 124 of rotational symmetry of the mirror surface 122, but its mirror surface, in contrast to FIGS. 1 and 2, is sloped by 45° with respect to the axis of rotation 124.

The device as shown in FIG. 4 is especially suited for applications in which a beam, for example, a light beam, in a plane which is perpendicular to the incident beam 126 must be turned around the point P' in a large range of angles, for example up to 360°. In the embodiment as shown in FIGS. 1 and 2, the embodiment of the mirror surface 22 of the mirror arrangement 20 does not cause any basic limitation of the angle of rotation α of the incident beam 26, but this limitation occurs by the embodiment of mirrors 14 and 16 or the direction of incidence of the beam 26.

However, basically, also in the embodiment as in FIG. 4, in which the incident beam lies on the axis of rotational symmetry of the mirror arrangement and there is a first mirror which is sloped by 45°, at the destination point P' there can be a second mirror as in FIGS. 1 and 2 in order to effect independent deflection in a second spacial direction. This second mirror can be made as in FIG. 1, i.e., with the mirror surface parallel to the axis of rotation, or like the mirror 114 in FIG. 4, with a mirror surface sloped by 45° with respect to the axis of rotation of the mirror. Furthermore, it is also possible that only the second mirror has a mirror surface which is sloped by 45° with respect to the axis of rotation of the mirror.

In all embodiments, beam deflection at points P and P' can take place instead of with rotary mirrors also, for example, with acousto-optical deflectors.

The special advantage of the arrangement in accordance with the invention with a rotationally symmetrical mirror arrangement lies in that possible imaging errors of the arrangement do not depend on the deflection angle of the first deflection unit, and therefore, very large deflection angles of the first deflection unit are also possible. The invariance of the destination point P' with respect to deflection by the first deflection unit is thus ensured, fundamentally, for any deflection angles of the first deflection unit. It goes without saying that the invention is still useful when the deflection point P and the destination point P' do not lie exactly on the axis of rotational symmetry. Depending on the requirements for imaging errors in the respective application, thus, also deviations of position in this regard are encompassed by the invention.

What is claimed is:

1. Device for deflecting a beam, comprising:
   an adjustable first beam deflection unit which has a deflection point at which the beam is deflected; and
   a rotational symmetric mirror arrangement with a mirror surface which images the deflection point onto a destination point;
   wherein the mirror arrangement is rotationally-symmetrical over at least a defined range of deflection angles, the deflection point and the destination point being located at least near the axis of rotational symmetry of the mirror arrangement.

2. Device as claimed in claim 1, wherein the first beam deflection unit is formed by a first mirror which is turnable around an axis of rotation.

3. Device as claimed in claim 2, further comprising a second adjustable beam deflection unit for deflecting the beam at the destination point.

4. Device as claimed in claim 3, wherein the second beam deflection unit is formed by a mirror which is turnable around an axis of rotation.

5. Device as claimed in claim 4, wherein the axis of rotation of the second mirror is perpendicular to the axis of rotation of the first mirror.

6. Device as claimed in claim 2, wherein the axis of rotation of the first mirror is offset parallel to the axis of rotational symmetry of the mirror arrangement.

7. Device as claimed in claim 6, wherein the axis of rotation of the first mirror runs through the center of gravity.

8. Device as claimed in claim 2, wherein the axis of rotation of the first mirror coincides with the axis of rotational symmetry of the mirror arrangement.

9. Device as claimed in claim 8, wherein the axis of rotation of the first mirror lies in the mirror surface.

10. Device as claimed in claim 4, wherein the mirror surface of at least one of the first and second mirror are planar.

11. Device as claimed in claim 1, wherein the axis of rotational symmetry of the mirror arrangement is arranged perpendicular to a incident beam from a beam source.

12. Device as claimed in claim 1, wherein the axis of rotational symmetry of the mirror arrangement is arranged along a incident beam from a beam source.

13. Device as claimed in claim 12, wherein the first beam deflection unit is formed by a first mirror which is turnable around an axis of rotation; wherein the axis of rotation of the first mirror is identical to the axis of rotational symmetry of the mirror arrangement and the first mirror is inclined by 45° relative to said axis of rotation.

14. Device as claimed in claim 1, wherein the mirror arrangement is afocal.

15. Device as claimed in claim 14, wherein the mirror arrangement is constructed to cause portions of the beam incident on and emergent from the mirror arrangement to lie in parallel planes.

16. Device as claimed in claim 15, wherein the beam incident on the mirror arrangement is parallel in an opposite direction and laterally offset relative to the beam emergent from the mirror arrangement.

17. Device as claimed in claim 1, wherein the mirror arrangement has a continuous mirror surface.

18. Device as claimed in claim 17, wherein the mirror surface of the mirror arrangement is mirror-symmetrical with respect to a plane which is perpendicular to the axis of rotational symmetry of the mirror arrangement.

19. Device as claimed in claim 1, wherein the mirror surface of the mirror arrangement comprises two segments which are separate from one another.

20. Device as claimed in claim 19, wherein the mirror surface of the mirror arrangement is mirror-symmetrical with respect to a plane which is perpendicular to the axis of rotational symmetry of the mirror arrangement.

21. Device as claimed in claim 1, wherein the mirror surface of the mirror arrangement is mirror-symmetrical with respect to a plane which is perpendicular to the axis of rotational symmetry of the mirror arrangement; and wherein the deflection point and the destination point are mirror-symmetrical with respect to the plane of symmetry of the mirror surface of the mirror arrangement.

22. Device as claimed in claim 21, wherein the mirror surface of the mirror arrangement is formed by at least a segment of a parabolic torus which is defined by a parabola rotated around the axis of rotational symmetry of the mirror arrangement.

23. Device as claimed in claim 1, wherein the beam is a light beam.

24. Device as claimed in claim 17, wherein other optical components are arranged in a path of the beam between a first reflection on the mirror surface and a second reflection on the mirror surface passes.

25. Device as claimed in claim 19, wherein other optical components are arranged in a path of the beam between a first reflection on the mirror surface and a second reflection on the mirror surface passes.

26. Process for deflection of a beam by means of rotation of a mirror surface of a planar mirror from a middle position, comprising the steps of setting a location of an axis of rotation of the planar mirror with respect to the planar mirror which lies outside the mirror surface, determining the location of the axis of rotation with respect to the beam based on the fact that, for different points of incidence of the beam on the mirror surface in the middle position, for certain angles of rotation of the mirror, intersection points occur between the rearward extension of the beam which has been reflected at one of these angles of rotation and the rearward extension of the beam which has been reflected in the middle position, thereby obtaining sets of intersection points for each point of incidence with the beam being reflected in the middle position, and determining from the sets of intersection points obtained, that set of intersection points which shows a minimum variation of intersection points with the angle of rotation with respect to a suitable criterion, and choosing a location for the axis of rotation of the mirror according to the point of incidence which belongs to the set of intersection points determined to show the minimum variation.

27. Process as claimed in claim 26, wherein a computer is used to determine the individual sets of intersection points and the set of intersection points with the minimum variation.

28. Process as claim 26, wherein the axis of rotation runs through the center of gravity of the mirror.

* * * * *